US009830733B2

(12) United States Patent
Hwang et al.

(10) Patent No.: US 9,830,733 B2
(45) Date of Patent: Nov. 28, 2017

(54) METHOD AND APPARATUS FOR PERFORMING RAY-NODE INTERSECTION TEST

(71) Applicant: SAMSUNG ELECTRONICS CO., LTD., Suwon-si (KR)

(72) Inventors: Seokjoong Hwang, Seoul (KR); Youngsam Shin, Hwaseong-si (KR); Wonjong Lee, Seoul (KR); Jaedon Lee, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 179 days.

(21) Appl. No.: 14/690,708

(22) Filed: Apr. 20, 2015

(65) Prior Publication Data
US 2016/0085510 A1  Mar. 24, 2016

(30) Foreign Application Priority Data

Sep. 18, 2014  (KR) .......................... 10-2014-0124636

(51) Int. Cl.
*G06T 15/40*  (2011.01)
*G06T 15/06*  (2011.01)

(52) U.S. Cl.
CPC .................................... *G06T 15/06* (2013.01)

(58) Field of Classification Search
CPC ..................................................... G06T 15/06
See application file for complete search history.

(56) References Cited

U.S. PATENT DOCUMENTS

| 6,597,359 | B1 * | 7/2003 | Lathrop ................. G06T 15/06 345/420 |
| 8,217,935 | B2 | 7/2012 | Purcell et al. |
| 2002/0171644 | A1 * | 11/2002 | Reshetov ............... G06T 17/20 345/420 |
| 2011/0283059 | A1 | 11/2011 | Govindarajan et al. |
| 2013/0321420 | A1 | 12/2013 | Laine et al. |

FOREIGN PATENT DOCUMENTS

| KR | 10-2009-0117451 A | 11/2009 |
| KR | 10-2011-0048200 A | 5/2011 |

OTHER PUBLICATIONS

Hanika, Johannes, and Alexander Keller. "Towards hardware ray tracing using fixed point arithmetic." *Interactive Ray Tracing*, 2007. RT'07. *IEEE Symposium on*. IEEE, 2007. (10 pages, in English).

* cited by examiner

*Primary Examiner* — Martin Mushambo
(74) *Attorney, Agent, or Firm* — F. Chau & Associates, LLC

(57) ABSTRACT

A method and apparatus to perform a ray-node intersection test are provided. The method includes receiving an input representing coordinates of a bounding box and an origin coordinate of a ray as fixed-point numbers, obtaining difference values between the input coordinates of the bounding box and the origin coordinate, and obtaining multiplication values between the obtained difference values and a reciprocal number of a direction vector of the ray, where the reciprocal number is a floating-point number.

17 Claims, 7 Drawing Sheets

METHOD AND APPARATUS FOR PERFORMING RAY-NODE INTERSECTION TEST

CROSS-REFERENCE TO RELATED APPLICATIONS

This application claims the benefit under 35 U.S.C. §119(a) of Korean Patent Application No. 10-2014-0124636 filed on Sep. 18, 2014, in the Korean Intellectual Property Office, the entire disclosure of which is incorporated herein by reference for all purposes.

BACKGROUND

1. Field

The following description relates to methods and apparatuses for performing ray-node intersection tests.

2. Description of Related Art

When an acceleration structure that partitions a space is traversed in ray tracing, a bounding box includes, with respect to each coordinate axis, a minimum coordinate and a maximum coordinate of a region that includes an object. In ray tracing, such a bounding box is used to perform a ray-node intersection test, which is a part of a process of traversing a space partitioning-acceleration structure. When the ray-node intersection test is performed, a floating-point operation or a fixed-point operation may be used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are methods and apparatuses for performing ray-node intersection tests.

Additional aspects are set forth in part in the description which follows and, in part, will be apparent from the description, or may be learned by practice of the presented examples.

In one general aspect, a method to perform a ray-node intersection test includes receiving an input including fixed-point numbers representing coordinates of a bounding box and an origin coordinate of a ray, obtaining difference values between the input coordinates of the bounding box and the input origin coordinate, and obtaining multiplication values between the obtained difference values and a reciprocal number of a direction vector of the ray, wherein the reciprocal number is a floating-point number.

The receiving of the input may include receiving an input including a fixed-point number representing a maximum value among the coordinates of the bounding box, wherein the obtaining of the difference values includes obtaining a difference value between the maximum value and the origin coordinate, and wherein the obtaining of the multiplication values includes obtaining a multiplication value between the obtained difference value between the maximum value and the origin coordinate and the reciprocal number of a direction vector of the ray.

The receiving of the input may include receiving input including a fixed-point number representing a minimum value among the coordinates of the bounding box, wherein the obtaining of the difference values includes obtaining a difference value between the minimum value and the input origin coordinate, and wherein the obtaining of the multiplication values includes obtaining a multiplication value between the obtained difference value between the minimum value and the origin coordinate and the reciprocal number of a direction vector of the ray.

The obtaining of the multiplication values may include obtaining an added value by adding a predetermined value to a mantissa of the reciprocal number, determining a sign of the added value, and obtaining multiplication values between the added value to which the determined sign is applied and the difference values.

The method may further include shifting the multiplication values by a predetermined number of positions.

The shifting may be performed by using an exponent of the reciprocal number, exponents of the difference values, exponents of the multiplication values, and a bit number of the mantissa of the reciprocal number.

The shifted multiplication values may be fixed-point numbers.

The predetermined value may be set by using a bit number of the mantissa of the reciprocal number that is a floating-point number.

The obtaining of the multiplication values may include determining the sign by using a sign bit of the reciprocal number.

In another general aspect, an apparatus for performing a ray-node intersection test includes an input unit configured to receive an input includes fixed-point numbers representing coordinates of a bounding box and an origin coordinate of a ray, a difference value obtaining unit configured to obtain difference values between the input coordinates of the bounding box and the input origin coordinate, and a multiplication value obtaining unit configured to obtain multiplication values between the obtained difference values and a reciprocal number of a direction vector of the ray, wherein the reciprocal number is a floating-point number.

The input unit may receive an input including a fixed-point number representing a maximum value among the coordinates of the bounding box, wherein the difference value obtaining unit obtains a difference value between the maximum value and the input origin coordinate, and wherein the multiplication value obtaining unit obtains a multiplication value between the obtained difference value between the maximum value and the origin coordinate and the reciprocal number of a direction vector of the ray.

The input unit may receive an input including a fixed-point number representing a minimum value among the coordinates of the bounding box, wherein the difference value obtaining unit obtains a difference value between the minimum value and the input origin coordinate, and wherein the multiplication value obtaining unit obtains a multiplication value between the obtained difference value between the minimum value and the origin coordinate and the reciprocal number of a direction vector of the ray.

The multiplication value obtaining unit may obtain an added value by adding a predetermined value to a mantissa of the reciprocal number, may determine a sign of the added value, and may obtain multiplication values between the added value to which the determined sign is applied and the difference values.

The apparatus may further include a shifting unit that shifts the multiplication values by a predetermined number of positions.

The shifting unit may perform shifting by using an exponent of the reciprocal number, exponents of the difference values, exponents of the multiplication values, and a bit number of the mantissa of the reciprocal number.

The shifted multiplication values may be fixed-point numbers.

The predetermined value may be set by using a bit number of the mantissa of the reciprocal number that is a floating-point number.

The multiplication value obtaining unit may determine the sign by using a sign bit of the reciprocal number.

In another general aspect, a method to perform a ray-node intersection test includes obtaining difference values between received coordinates of a bounding box and the input origin coordinate, wherein the coordinates are fixed-point numbers, and obtaining multiplication values between the obtained difference values and a reciprocal number of a direction vector of the ray, wherein the reciprocal number is a floating-point number.

The obtaining of the multiplication values may include obtaining an added value by adding a predetermined value to a mantissa of the reciprocal number, determining a sign of the added value, and obtaining multiplication values between the added value to which the determined sign is applied and the difference values.

Other features and aspects will be apparent from the following detailed description, the drawings, and the claims.

Figure 1A:
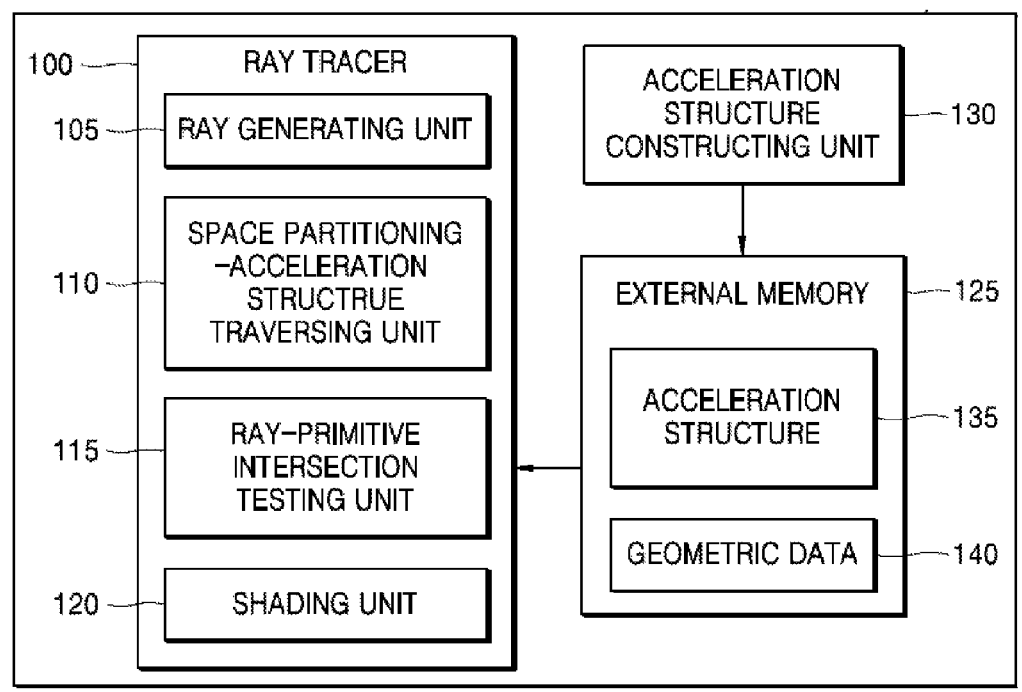
FIGS. 1A through 1F are views for illustrating a ray tracing method by using a graphics processing unit (GPU) that includes a ray tracer.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Reference is now made to examples which are illustrated in the accompanying drawings. The examples are merely intended to be illustrative and are not intended to pose a limitation on the scope of the application. The examples are intended to encompass all examples that would normally occur to one of ordinary skill in the art. Throughout the specification, when a unit "includes" or "comprises" an element, another element is potentially further included, rather than excluding the existence of the other element, unless otherwise described. As used in the application, the term "and/or" includes any and all combinations of one or more of the associated listed items.

Also, the term "unit" used herein refers to hardware components such as a field-programmable gate array (FPGA) or an application specific integrated circuit (ASIC) and such a "unit" performs various functions. In some examples, the "unit" is included in a storage medium which performs functions and may also operate in conjunction with one or more processors. Also in some examples, functions provided in the components and the "units" are combined in a smaller number of components and "units" or are further separated into additional components and "units."

In the present specification, "3D rendering" refers to an image processing process of converting three-dimensional object data into an image associated with a given camera point of view. Rendering methods includes rasterization and ray tracing. In rasterization, an image is generated while a three-dimensional object is projected onto a screen. In ray tracing, an image is generated by tracing a path of light by following light rays travelling toward respectively corresponding pixels of an image to be incident thereon from a camera point of view.

FIGS. 1A through 1F are views for illustrating a ray tracing method by using a graphics processing unit (GPU) 1 that includes a ray tracer 100. In the example of FIG. 1A, the GPU 1 includes the ray tracer 100, an external memory 125, and an acceleration structure constructing unit 130.

In the example of FIG. 1A, the ray tracer 100 includes a ray generating unit 105, a space partitioning-acceleration structure traversing unit 110, a ray-primitive intersection testing unit 115, and a shading unit 120. Also in the example of FIG. 1A, the external memory 125 stores an acceleration structure 135 and geometric data 140. In an example, the external memory 125 also stores the acceleration structure 135 constructed by the acceleration structure constructing unit 130. For example, the acceleration structure 135 that the external memory 125 stores includes a structure in which a three-dimensional space is modeled in the form of a hierarchical tree.

In one such example, the acceleration structure 135 includes a k-dimensional (k-d) tree, a bounding volume hierarchy (BVH), and a grid. The k-d tree is a multidimensional search tree and is a tree structure in which a k-dimensional space is partitioned by dots. The BVH is a tree structure that includes a set of geometric objects. In the BVH, all geometric objects are wrapped in bounding volumes that form leaf nodes of the tree. The grid is a structure in which a two-dimensional space is represented by intersecting straight lines. However, these structures are only examples of information stored in the acceleration structure 135, and in other examples, the acceleration structure 135 includes additional or alternative information used to model the three-dimensional space.

In examples, the geometric data 140 that the external memory 125 stores includes data representing two-dimensional space objects. For example, the geometric data 140 includes properties of triangles, equations representing triangles, and properties of triangle coordinates.

Figure 1B:
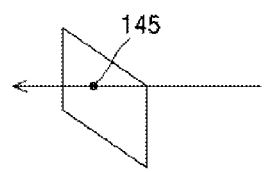
Figure 1C:
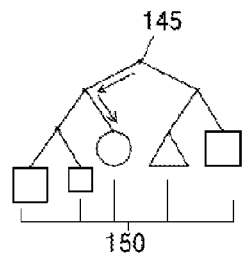

The ray generating unit 105 generates, from camera information, a virtual ray corresponding to each pixel of a screen in a three-dimensional space. FIG. 1B illustrates a case in which the ray generating unit 105 generates from one pixel 145 among pixels of the screen a virtual ray in a three-dimensional space. The space partitioning-acceleration structure traversing unit 110 traces a path of a ray in the acceleration structure 135 that is stored in the external memory 125. The space partitioning-acceleration structure traversing unit 110 then finds the leaf node that the ray reaches first by hierarchical traversal of the tree from a root node of an acceleration structure tree down a leaf node of such a root node. Here, the root node refers to the topmost node in the tree, and the leaf node refers to the bottommost node in the tree. FIG. 1C illustrates a process performed in such a tree by the space partitioning-acceleration structure traversing unit 110 wherein traversal takes place from a root node 145 down leaf nodes 150. In the example of FIG. 1C, the space partitioning-acceleration structure traversing unit 110 uses a bounding box in a ray-node intersection test to test whether the ray has intersected each of the nodes. For example, the bounding box includes, with respect to each coordinate axis, a minimum coordinate and a maximum coordinate of a region including an object. Referring to the example of FIG. 1F, coordinates of a bounding box generated with respect to an object 165 include a minimum coordinate 170 and a maximum coordinate 175 with respect to an x-axis, and include the minimum coordinate 170 and a maximum coordinate 180 with respect to a y-axis. If the object 165 is three-dimensional, a minimum value and a maximum value with respect to a z-axis are also potentially included.

Figure 1D:
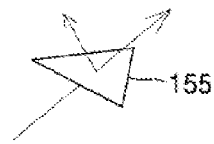

If the GPU 1 encodes the coordinates of the bounding box as floating-point numbers, a floating-point operator that has a relatively larger size in comparison to another operator is used as an operator for a ray-node intersection test, which is a part of a process of traversing a space partitioning-acceleration structure. Alternatively, if the GPU 1 encodes the coordinates of the bounding box as fixed-point numbers, a fixed-point operator having a smaller size than the floating-point operator is used. The ray-primitive intersection testing unit 115 tests the visibility of an object adjacent to the ray. Referring to FIG. 1D, with respect to an object 155 adjacent to the ray, the ray-primitive intersection testing unit 115 tests whether the ray intersects a primitive in a leaf node. A primitive is the simplest geometric object that computer graphics process. If the ray-primitive intersection testing unit 115 fails to find a primitive in the leaf node that the ray intersects, the ray-primitive intersection testing unit 115 continues to traverse the tree and finds the primitive that the ray intersects. The ray-primitive intersection testing unit 115 finds the primitive by using the geometric data 140 stored in the external memory 125. Then, the shading unit 120 calculates an appropriate color of surfaces of a visible object. In order to give a three-dimensional effect to a model input to a computer, such shading, in an example, includes calculating a distance from a light source to each surface of the model, an angle between the light source and each surface of the model, a color of each surface of the model, and a contrast of each surface of the model to shade surfaces of the model appropriately.

Figure 1E:
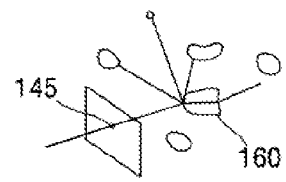
Figure 1F:
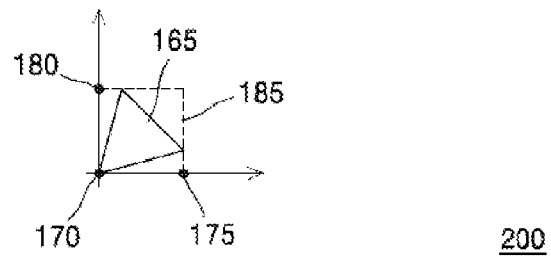

For example, FIG. 1E illustrates a process in which, in order to shade an object 160 that intersects with the ray generated from the pixel 145 on the screen, a distance from a light source to each surface of the object 160 and an angle between the light source and each surface of the object 160 are calculated, and based on the calculations, surfaces of the object 160 are shaded.

Figure 2:
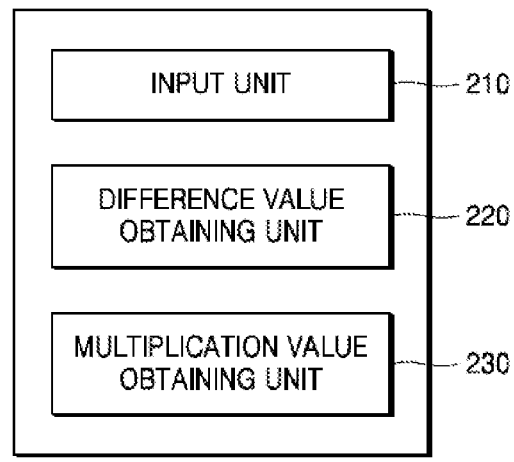
FIG. 2 illustrates an apparatus for performing a ray-node intersection test, the apparatus being included in a space partitioning-acceleration structure traversing unit of FIG. 1A according to an example.

FIG. 2 illustrates an apparatus 200 for performing a ray-node intersection test, the apparatus being included in the space partitioning-acceleration structure traversing unit 110 of FIG. 1A according to an example. In the example of FIG. 2, the apparatus 200 for performing a ray-node intersection test includes an input unit 210, a difference value obtaining unit 220, and a multiplication value obtaining unit 230.

In the example of FIG. 2, the input unit 210 receives an input representing coordinates of a bounding box and an origin coordinate of a ray as fixed-point numbers. Also, in an example, the input unit 210 receives an input representing a maximum value among the coordinates of the bounding box as a fixed-point number and/or an input representing a minimum value among the coordinates of the bounding box as a fixed-point number. In addition, the input unit 210, in an example, receives an input representing a reciprocal number based on a direction vector of the ray.

Also, in the example of FIG. 2, the difference value obtaining unit 220 obtains difference values between the input coordinates of the bounding box and the origin coordinate. Also, the difference value obtaining unit 220 obtains a difference value between the input maximum value and the origin coordinate and/or a difference value between the input minimum value and the origin coordinate.

Also, in the example of FIG. 2, the multiplication value obtaining unit 230 obtains multiplication values between the obtained difference values and the reciprocal number based on a direction vector of the ray. In this example, the reciprocal number is a floating-point number. Also, in this example, the multiplication value obtaining unit 230 obtains a multiplication value between the obtained difference value between the maximum value and the origin coordinate and the reciprocal number of a direction vector of the ray and/or a multiplication value between the obtained difference value between the minimum value and the origin coordinate and the reciprocal number of a direction vector of the ray. In addition, the multiplication value obtaining unit 230 obtains a value by adding a predetermined value to a mantissa of the reciprocal number. Here, because the reciprocal number is a floating-point number, the mantissa is the basic number or significand and is raised to an appropriate exponent.

For example, the predetermined value added to the mantissa of the reciprocal number is set by using a bit number of the mantissa of the reciprocal number represented as a floating-point number. Here, the multiplication value obtaining unit 230 determines a sign of the added value. Thus, the multiplication value obtaining unit 230 obtains multiplication values between the added value to which the determined sign is applied and the difference values.

Figure 4:
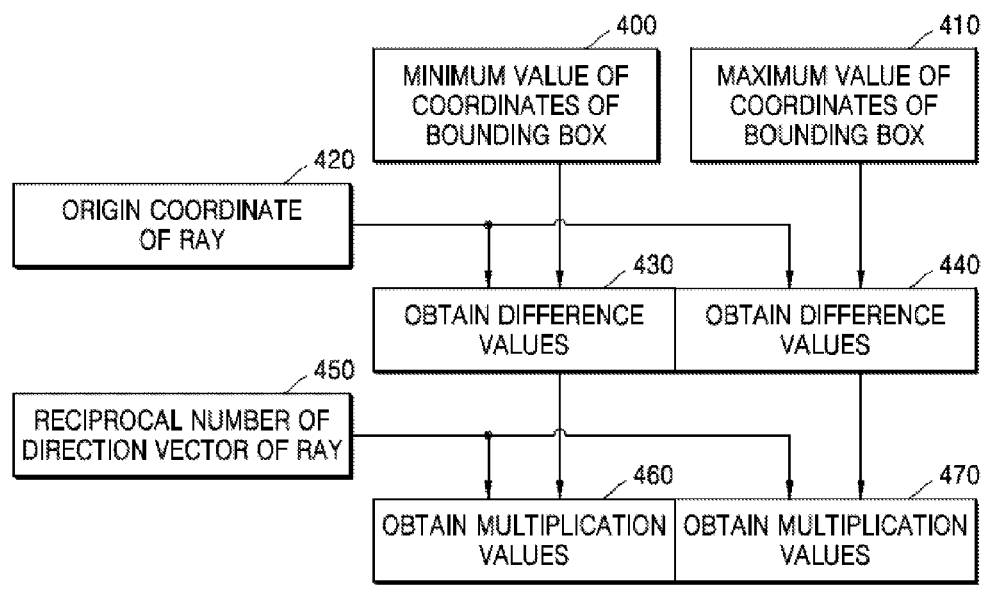
FIG. 4 illustrates a method of performing a ray-node intersection test according to an example.

An operation of the apparatus 200 for performing a ray-node intersection test is described with reference to FIG. 4. FIG. 4 illustrates a method of performing a ray-node intersection test according to an example.

In the example of FIG. 4, the input unit 210 receives an input representing a minimum value 400 and a maximum value 410 of coordinates of a bounding box. In the example of FIG. 4, the minimum value 400 and the maximum value 410 are floating-point numbers. In this example, the input unit 210 also receives an input representing an origin coordinate 420 of a ray. In such an example, the origin coordinate 420 of the ray is a fixed-point number. The difference value obtaining unit 220 obtains a difference value 430 between the minimum value 400 among the ordinates of the bounding box and the origin coordinate 420 of the ray. The difference value obtaining unit 220 also obtains a difference value 440 between the maximum value 410 among the ordinates of the bounding box and the origin coordinate 420 of the ray. In this example, difference values obtained by the difference value obtaining unit 220 are fixed-point numbers. The multiplication value obtaining unit 230 obtains a multiplication value 460 by multiplying the difference value 430 between the minimum value 400 among the ordinates of the bounding box and the origin coordinate 420 of the ray by a reciprocal number 450 of a direction vector of the ray. The multiplication value obtaining unit 230 obtains a multiplication value 470 by multiplying the difference value 440 between the maximum value 410 among the ordinates of the bounding box and the origin coordinate 420 of the ray by the reciprocal number 450 of a direction vector of the ray. In this example, the reciprocal number 450 of a direction vector of the ray is a floating-point number. Accordingly, the multiplication value obtaining unit 230 obtains multiplication values by multiplying a floating-point number and a fixed-point number to obtain their product.

The ray-node intersection test includes a floating-point operation and a fixed-point operation. In situations where a range of values to be processed is relatively limited, it is possible to configure the fixed-point operation by using an operator with similar precision at a lower cost compared to the floating-point operation. However, if the range of values to be processed is relatively wide, it potentially takes more computational cost to configure the fixed-point operator than the floating-point operator. However, various values processed in the ray-node intersection test used for ray tracing have different ranges of values that need to be processed depending on properties of the values. When considering how to process the values, examples are designed based on the understanding that an operator for multiplying a fixed-point number and another fixed point number takes less computational resources than an operator for multiplying a fixed-point number and a floating-point number. Accordingly, because the multiplication value obtaining unit 230 multiplies a floating-point number and a fixed-point number and thus takes more computational cost than the operator for multiplying a fixed-point number and another fixed point number.

Figure 3:
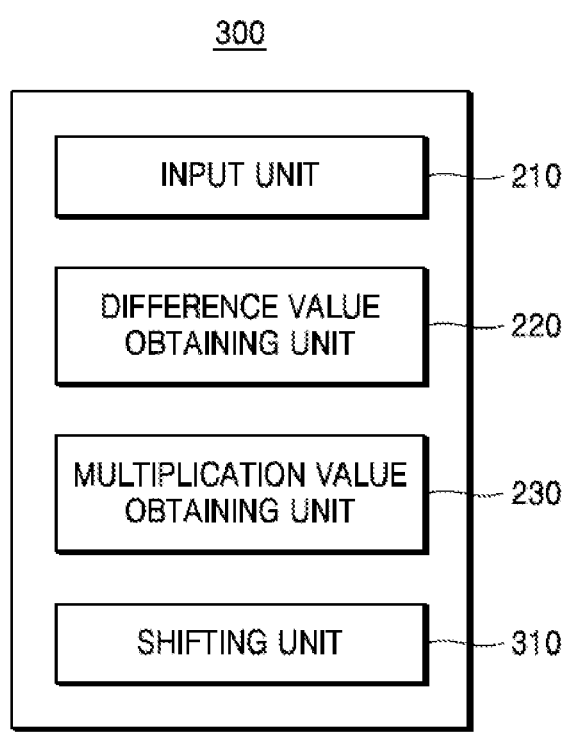
FIG. 3 illustrates an apparatus for performing a ray-node intersection test, the apparatus being included in the space partitioning-acceleration structure traversing unit of FIG. 1A according to another example.

FIG. 3 illustrates an apparatus 300 for performing a ray-node intersection test, the apparatus being included in the space partitioning-acceleration structure traversing unit 110 of FIG. 1A according to another example. In the example of FIG. 3, the apparatus 300 for performing a ray-node intersection test includes an input unit 210, a difference value obtaining unit 220, a multiplication value obtaining unit 230, and a shifting unit 310.

In the example of FIG. 3, the input unit 210 receives an input representing coordinates of a bounding box and an origin coordinate of a ray as fixed-point numbers. Also, the input unit 210 receives an input representing a maximum value among the coordinates of the bounding box as a fixed-point number and receives an input representing a minimum value among the coordinates of the bounding box as a fixed-point number. In addition, the input unit 210 receives an input representing a reciprocal number of a direction vector of the ray.

Further, the difference value obtaining unit 220 obtains difference values between the input coordinates of the bounding box and the origin coordinate. Also, the difference value obtaining unit 220 obtains a difference value between the input maximum value and the origin coordinate. The difference value obtaining unit 220 obtains a difference value between the input minimum value and the origin coordinate.

Also, the multiplication value obtaining unit 230 obtains multiplication values that are products of the obtained difference values and the reciprocal number of a direction vector of the ray. In the example of FIG. 3, the reciprocal number is a floating-point number. Also, the multiplication value obtaining unit 230 obtains a multiplication value that is a product of the obtained difference value between the maximum value and the origin coordinate and the reciprocal number of a direction vector of the ray and also obtains a multiplication value that is a product of the obtained difference value between the minimum value and the origin coordinate and the reciprocal number of a direction vector of the ray. In addition, in this example, the multiplication value obtaining unit 230 obtains a value by adding a predetermined value to a mantissa of the reciprocal number. The predetermined value is set by using a bit number of the mantissa of the reciprocal number represented as a floating-point number. The multiplication value obtaining unit 230 also determines a sign of the added value. Thus, the multiplication value obtaining unit 230 obtains multiplication values that are products of the added value to which the determined sign is applied and the difference values.

The shifting unit 310 shifts the multiplication values based on a predetermined number of positions. In this example, the shifted multiplication values are fixed-point numbers. Thus, the shifting unit 310 performs shifting by using an exponent of the reciprocal number, exponents of the difference values, exponents of the multiplication values, and the bit number of the mantissa of the reciprocal number.

Figure 5:
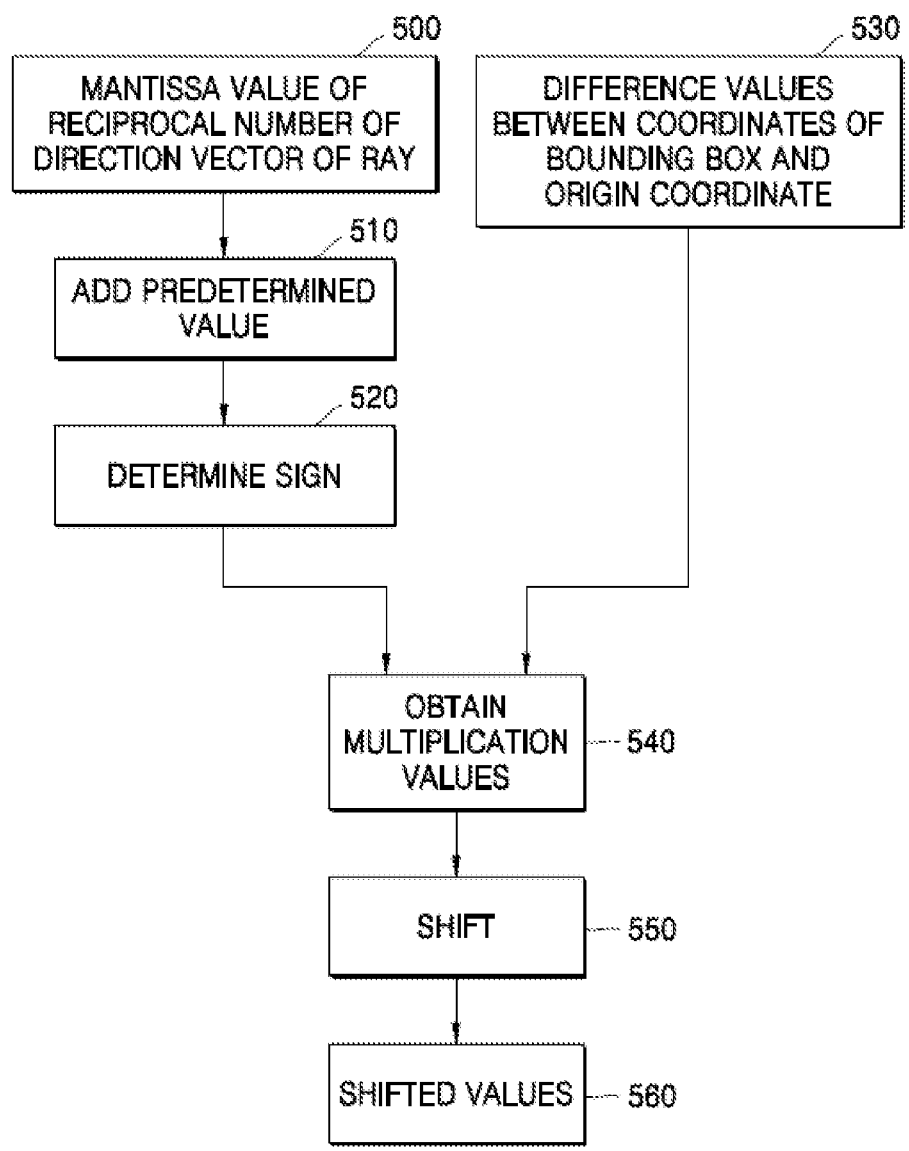
FIG. 5 illustrates a method of performing a ray-node intersection test according to another example.

An operation of the apparatus 300 for performing a ray-node intersection test is described with reference to FIG. 5. FIG. 5 illustrates a method of performing a ray-node intersection test according to another example.

A reciprocal number of a direction vector of a ray is a floating-point number, and therefore is divided into an exponent part and a mantissa part. In the example of FIG. 5, the multiplication value obtaining unit 230 adds a predetermined value 510 to a mantissa 500 of the reciprocal number of a direction vector of the ray. In this example, the predetermined value 510 is set by using a bit number of the mantissa 500 of the reciprocal number of a direction vector of the ray. The multiplication value obtaining unit 230 determines a sign 520 of the reciprocal number of a direction vector of the ray by using a sign bit of the reciprocal number of a direction vector of the ray. The multiplication value obtaining unit 230 multiplies the signed reciprocal number of a direction vector of the ray and difference values 530 between coordinates of a bounding box and an origin coordinate, and thus obtains multiplication values 540. The shifting unit 310 performs shifting 550 of the multiplication values 540 and thus obtains shifted values 560. Thus, the shifted values 560 are fixed-point numbers obtaining by adjusting the decimal position of the multiplication values 540.

The reciprocal number of a direction vector of a ray is represented via the expression below.

$$(-1)^{A_s} \cdot (A_m + 2^{A_{mbw}}) \cdot 2^{A_e - A_{mbw} - A_b}$$

In the expression, $A_m$ represents a mantissa of a reciprocal number of a direction vector of a ray. $A_{mbw}$ represents a bit length of the mantissa of the reciprocal number of a direction vector of the ray and represents the number of bits. $A_s$ represents a sign of the reciprocal number of a direction vector of the ray. $A_e$ represents an exponent of the reciprocal number of a direction vector of the ray. $A_b$ represents a bias of the exponent of the reciprocal number of a direction vector of the ray. For example, assuming that an exponent of a floating-point number ranges from −128 to 127, as the apparatus 300 always represents a sign of an exponent part of the floating-point number as being positive, the apparatus 300 represents values in a range of 0 to 255, where the values are obtained by adding 128 to the exponent as a whole. Therefore, the actual exponent may be obtained by subtracting 128 from each of the represented values ranging from 0 to 255. Accordingly, the number 128 that is to be subtracted corresponds to the bias.

The difference value 530 between a coordinate of a bounding box and an origin coordinate is represented via the expression below.

$$B_i \cdot 2^{B_e}$$

In the above expression, $B_i$ represents a fixed-point number of the difference value 530 between a coordinate of a bounding box and an origin coordinate, and $B_e$ represents an exponent of the difference value 530 between a coordinate of a bounding box and an origin coordinate.

The multiplication value obtaining unit 230 adds the predetermined value 510 to the mantissa 500 of the reciprocal number of a direction vector of the ray, which is represented via the expression below. The expression below is intended to denote recovering a value of 1 before a decimal point omitted from a floating-point representation. The symbols used in the expression below have already been defined, above.

$$(A_m + 2^{A_{mbw}})$$

The multiplication value obtaining unit 230 determines the sign 520 of the reciprocal number of a direction vector of the ray by using the sign bit of the reciprocal number of a direction vector of the ray, which is represented via the expression below. The expression below is intended to denote recovering a sign value of a floating-point number. The symbol used in the expression below has already been defined, above.

$$(-1)^{A_s}$$

A value by which the multiplication value 540 is shifted when the shifting unit 310 performs the shifting 550 of the multiplication value 540 to obtain the shifted value 560 is represented via the expression below. Such shifting corresponds to shifting to the left with respect to a multiplication value to adjust a decimal position of a fixed-point number. However, when a value of the expression below is negative, the multiplication value is shifted to the right by as much as an absolute value of the corresponding value. $C_e$ represents an exponent of the multiplication value. Thus, a shifted value obtained by shifting the multiplication value by as much as the value of the expression below is a fixed-point number of the multiplication value.

$$A_e - A_b - A_{mbw} + B_e - C_e$$

In a system in which the nodes of the space partitioning-acceleration structure 135 are provided in an axis-aligned bounding box (AABB), an AABB-based ray-node intersection test performed by the apparatus 300 as a space-node intersection test is represented via the expressions below.

$$LT_i = M\text{Mult}(W_i, LB_i - O_i), i \in \{x, y, z\}$$

$$UT_i = M\text{Mult}(W_i, UB_i - O_i), i \in \{x, y, z\}$$

$$\text{Min}T = \max\{\min(LT_i, UT_i): i \in \{x, y, z\}\}$$

$$\text{Max}T = \min\{\max(LT_i, UT_i): i \in \{x, y, z\}\}$$

In the above expression, $\{x,y,z\}$ is intended to denote each axis of a three-dimensional coordinate system. LB represents a minimum value with respect to each axis of the AABB. UB represents a maximum value with respect to each axis of the AABB. O is intended to denote an origin of each axis of the ray. W is intended to denote an inverse direction of each axis of the ray. In the above expression, MMult corresponds to the multiplication value obtaining unit 230 of the apparatus 300. Thus, when MinT is equal to or less than MaxT, the ray and the node intersect.

In a ray tracing system, the maximum value and the minimum value of the AABB and the origin of the ray, respectively, have a limited range of values. However, the inverse direction of the ray potentially has a very wide range of values. Accordingly, the inverse direction of the ray, which potentially has a broad range of values, is represented as a floating-point number and the other values are represented as fixed-point numbers so that similar precision is obtained at a lower computational cost compared to an intersection tester using floating-point numbers only, because replacing some of the floating-point numbers with fixed-point numbers allows lower computational costs for calculations using those numbers.

Figure 6:
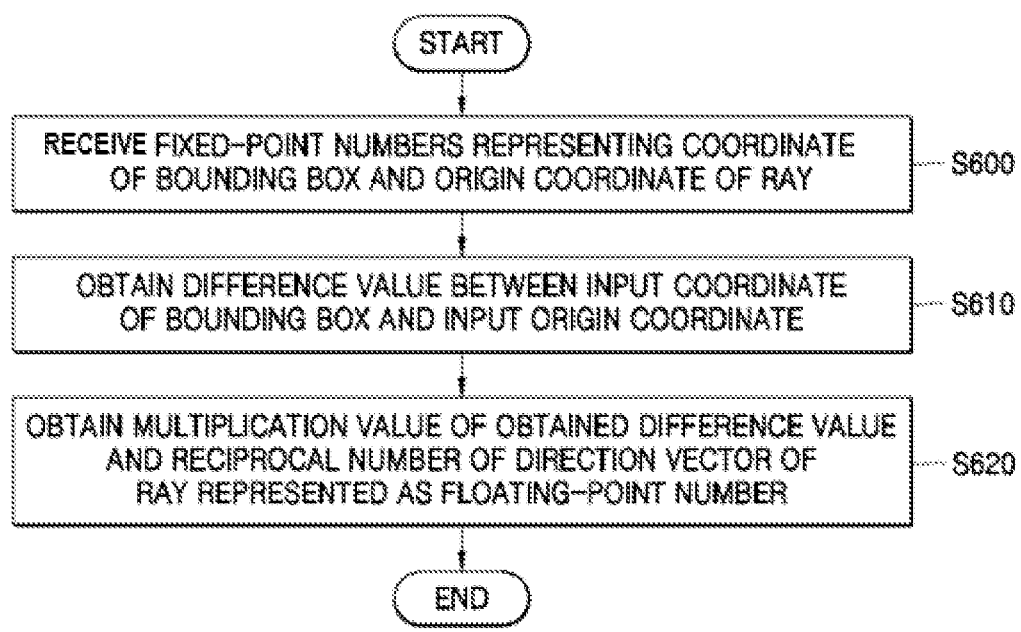
FIG. 6 is a flowchart of the method of performing a ray-node intersection test of the example of FIG. 4.

FIG. 6 is a flowchart of the method of performing a ray-node intersection test of the example of FIG. 4. Referring to FIG. 6, a method of performing a ray-node intersection test includes operations processed by the apparatus 200 of FIG. 2. In an example, such operations are performed in a specific sequence. Accordingly, although not illustrated, the above descriptions of the apparatus 200 of FIG. 2 are applicable to the method of FIG. 6.

In operation S600, the method receives fixed-point numbers representing a coordinate of a bounding box and an origin coordinate of a ray as fixed-point numbers. In operation S610, the method obtains a difference value between the input coordinate of the bounding box and the origin coordinate may be obtained. In operation S620, the method obtains a multiplication value between the obtained difference value and a reciprocal number of a direction vector of the ray which is represented as a floating-point number.

Figure 7:
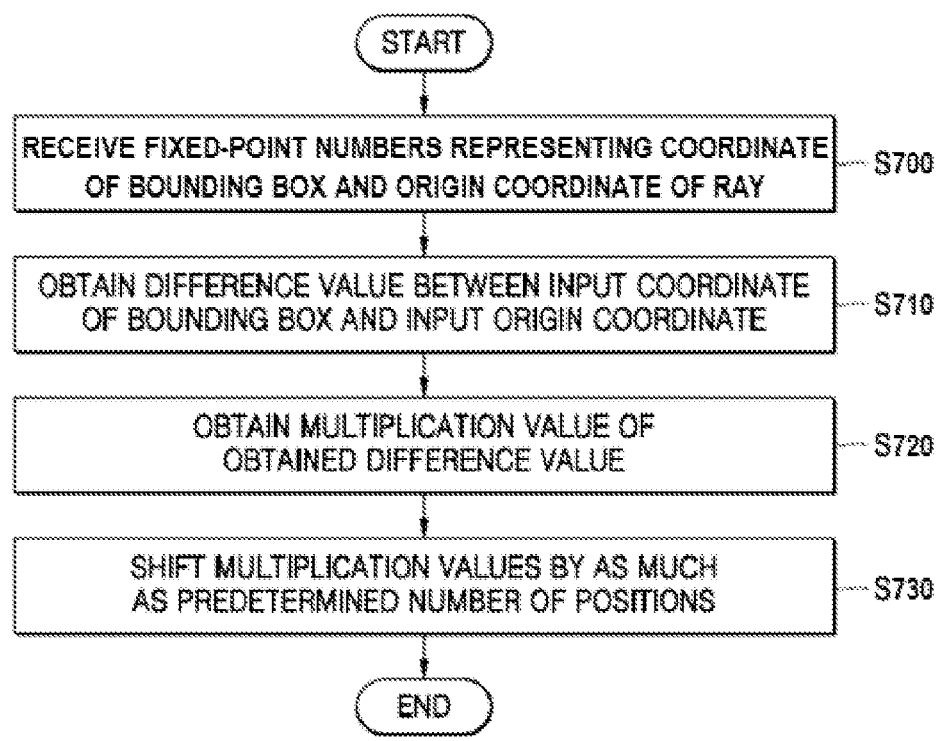
FIG. 7 is a flowchart of the method of performing a ray-node intersection test of the example of FIG. 5.

FIG. 7 is a flowchart of the method of performing a ray-node intersection test of FIG. 5. Referring to FIG. 7, a method of performing a ray-node intersection test includes operations processed by the apparatus 300 of FIG. 3. In an example, such operations are performed in a specific sequence. Accordingly, although not illustrated, the above descriptions of the apparatus 300 of FIG. 3 are applicable to the method of FIG. 7.

In operation S700, the method receives fixed-point numbers representing a coordinate of a bounding box and an origin coordinate of a ray. In operation S710, the method obtains a difference value between the input coordinate of the bounding box and the input origin coordinate. In operation S720, the method obtains a multiplication value between a reciprocal number of a direction vector of the ray which is a floating-point number and the obtained difference value. In operation S730, the method shifts the multiplication value by as much as a predetermined number of positions.

As described above, according to one or more of the above exemplary embodiments, a method of performing a ray-node intersection test may include both a floating point operation and a fixed point operation, thereby reducing computational costs and decreasing deterioration of a precision degree.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

The terms "a" and "an" and "the" and similar referents used herein (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope of the inventive concept.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed:

1. A method of performing a ray-node intersection test, the method comprising:
generating a ray in a rendering scene;
tracing a path of the ray in an acceleration structure comprising nodes; and
performing the ray-node intersection test to locate a node that intersects the ray,
wherein the ray-node intersection test comprises:
receiving an input comprising fixed-point numbers representing coordinates of a bounding box and an origin coordinate of the ray;
obtaining difference values between the input coordinates of the bounding box and the input origin coordinate; and
obtaining multiplication values between the obtained difference values and a reciprocal number of a direction vector of the ray,
wherein the reciprocal number is a floating-point number, and
wherein the obtaining of the multiplication values comprises:
obtaining an added value by adding a predetermined value to a mantissa of the reciprocal number;
determining a sign of the added value; and obtaining multiplication values between the added value to which the determined sign is applied and the differences values.

2. The method of claim 1, wherein the receiving of the input comprises receiving an input comprising a fixed-point number representing a maximum value among the coordinates of the bounding box,
wherein the obtaining of the difference values comprises obtaining a difference value between the maximum value and the origin coordinate, and
wherein the obtaining of the multiplication values comprises obtaining a multiplication value between the obtained difference value between the maximum value and the origin coordinate and the reciprocal number of a direction vector of the ray.

3. The method of claim 1, wherein the receiving of the input comprises receiving input comprising a fixed-point number representing a minimum value among the coordinates of the bounding box,
wherein the obtaining of the difference values comprises obtaining a difference value between the minimum value and the input origin coordinate, and
wherein the obtaining of the multiplication values comprises obtaining a multiplication value between the obtained difference value between the minimum value and the origin coordinate and the reciprocal number of a direction vector of the ray.

4. The method of claim 1, further comprising shifting the multiplication values by a predetermined number of positions.

5. The method of claim 4, wherein the shifting is performed by using an exponent of the reciprocal number, exponents of the difference values, exponents of the multiplication values, and a bit number of the mantissa of the reciprocal number.

6. The method of claim 4, wherein the shifted multiplication values are fixed-point numbers.

7. The method of claim 1, wherein the predetermined value is set by using a bit number of the mantissa of the reciprocal number that is a floating-point number.

8. The method of claim 1, wherein the obtaining of the multiplication values comprises determining the sign by using a sign bit of the reciprocal number.

9. An apparatus for performing a ray-node intersection test, the apparatus comprising:
a ray generator configured to generate a ray in a rendering scene; and
an acceleration structure traverser configured to trace a path of the ray in an acceleration structure comprising nodes, and to perform the ray-node intersection test to locate a node that intersects the ray,
wherein the acceleration structure traverser further comprises
an input unit configured to receive an input comprising fixed-point numbers representing coordinates of a bounding box and an origin coordinate of the ray;
a difference value obtaining unit configured to obtain difference values between the input coordinates of the bounding box and the input origin coordinate; and
a multiplication value obtaining unit configured to obtain multiplication values between the obtained difference values and a reciprocal number of a direction vector of the ray,
wherein the reciprocal number is a floating-point number, and
wherein the obtaining of the multiplication values comprises:
obtaining an added value by adding a predetermined value to a mantissa of the reciprocal number;
determining a sign of the added value; and obtaining multiplication values between the added value to which the determined sign is applied and the differences values.

10. The apparatus of claim 9, wherein the input unit receives an input comprising a fixed-point number representing a maximum value among the coordinates of the bounding box,
wherein the difference value obtaining unit obtains a difference value between the maximum value and the input origin coordinate, and
wherein the multiplication value obtaining unit obtains a multiplication value between the obtained difference value between the maximum value and the origin coordinate and the reciprocal number of a direction vector of the ray.

11. The apparatus of claim 9, wherein the input unit receives an input comprising a fixed-point number representing a minimum value among the coordinates of the bounding box,
wherein the difference value obtaining unit obtains a difference value between the minimum value and the input origin coordinate, and
wherein the multiplication value obtaining unit obtains a multiplication value between the obtained difference value between the minimum value and the origin coordinate and the reciprocal number of a direction vector of the ray.

12. The apparatus of claim 9, further comprising a shifting unit that shifts the multiplication values by a predetermined number of positions.

13. The apparatus of claim 12, wherein the shifting unit performs shifting by using an exponent of the reciprocal number, exponents of the difference values, exponents of the multiplication values, and a bit number of the mantissa of the reciprocal number.

14. The apparatus of claim 12, wherein the shifted multiplication values are fixed-point numbers.

15. The apparatus of claim 9, wherein the predetermined value is set by using a bit number of the mantissa of the reciprocal number that is a floating-point number.

16. The apparatus of claim 9, wherein the multiplication value obtaining unit determines the sign by using a sign bit of the reciprocal number.

17. A non-transitory computer readable medium comprising instructions that, when executed by a computer, cause a processor to perform a method of a ray-node intersection test, the method comprising:
   generating a ray in a rendering scene;
   tracing a path of the ray in an acceleration structure comprising nodes; and
   performing the ray-node intersection test to locate a node that intersects the ray,
wherein the ray-node intersection test comprises
   receiving an input comprising coordinates of a bounding box and an origin coordinate of the ray;
   obtaining difference values between the input coordinates of a bounding box and the input origin coordinate of the ray, wherein the coordinates are fixed-point numbers, and
   obtaining multiplication values between the obtained difference values and a reciprocal number of a direction vector of the ray,
wherein the reciprocal number is a floating-point number,
wherein the obtaining of the multiplication values comprises:
obtaining an added value by adding a predetermined value to a mantissa of the reciprocal number;
determining a sign of the added value; and
obtaining multiplication values between the added value to which the determined sign is applied and the difference values.

* * * * *